US010225131B2

(12) United States Patent
Kakani et al.

(10) Patent No.: US 10,225,131 B2
(45) Date of Patent: Mar. 5, 2019

(54) MANAGEMENT SYSTEM CROSS DOMAIN CONNECTIVITY DISCOVERY

(71) Applicant: CA, Inc., New York, NY (US)

(72) Inventors: Balram Reddy Kakani, Hyderabad (IN); Murali Krishna Chundru, Hyderabad (IN); Preethama Rao Akula, Hyderabad (IN)

(73) Assignee: CA, Inc., New York, NY (US)

( * ) Notice: Subject to any disclaimer, the term of this patent is extended or adjusted under 35 U.S.C. 154(b) by 167 days.

(21) Appl. No.: 15/235,443

(22) Filed: Aug. 12, 2016

(65) Prior Publication Data

US 2018/0048516 A1    Feb. 15, 2018

(51) Int. Cl.
*G06F 15/16* (2006.01)
*H04L 12/24* (2006.01)

(52) U.S. Cl.
CPC .......... *H04L 41/0213* (2013.01); *H04L 41/12* (2013.01); *H04L 41/042* (2013.01)

(58) Field of Classification Search
CPC . H04L 41/12; H04L 29/1232; H04L 41/0213; H04L 45/22; H04L 61/103; H04L 29/12028; H04L 29/12216
See application file for complete search history.

(56) References Cited

U.S. PATENT DOCUMENTS

| 7,197,546 | B1 | 3/2007 | Bagga et al. |
| 8,543,681 | B2 | 9/2013 | Bearden et al. |
| 2003/0031167 | A1* | 2/2003 | Singh .................. H04L 45/04 370/352 |
| 2004/0078683 | A1* | 4/2004 | Buia ................... H04L 12/66 714/37 |
| 2008/0159309 | A1* | 7/2008 | Sultan ............... H04L 12/2852 370/401 |

* cited by examiner

*Primary Examiner* — Djenane M Bayard
(74) *Attorney, Agent, or Firm* — Gilliam IP PLLC

(57) ABSTRACT

Techniques for determining target system connectivity between service domains are disclosed herein. For each of multiple service domains configured as a distributed management system, a discovery unit identifies subnets having at least one target system component within the service domain. The discovery unit determines from among the identified subnets, subnets that each extend between two or more of the service domains. For each of the subnets that extend between two or more of the service domains, the discovery unit detects target system network connections between two or more of the service domains. The discovery unit reports the detected target system network connections to one or more entities within the distributed management system.

17 Claims, 5 Drawing Sheets

MANAGEMENT SYSTEM CROSS DOMAIN CONNECTIVITY DISCOVERY

BACKGROUND

The disclosure generally relates to the field of systems and network management, and more particularly to management system cross domain connectivity discovery.

Management systems such as network management systems employing Simple Network Management Protocol (SNMP) implement operations and functions for monitoring and otherwise managing one or more target systems. The target systems may comprise sets or "domains" of subsystems, devices, and components that may be communicatively interconnected via a target system network. A management system may comprise a fault management system that monitors device/component operating behavior and may report on or otherwise remediate detected faults in system/device operation. For example, a fault management system may maintain error logs for identifying and addressing errors that occur as a result of system or device malfunctions and/or operating conditions. Fault management systems typically include component discovery functions for detecting and identifying components/devices within a specified management domain. With topological information including node identification and network connectivity information within a particular domain, a fault management system may perform operations and functions including fault tracing and isolation to identify root causes.

A fault management system is deployed in association with a specified domain comprising various systems, subsystems, devices, and components. In response to an error condition, a network device typically transmits an error message to a network operator or administrator using a network management protocol such as SNMP. Fault management system domains may be configured, in part, based on types or functions of the target systems, devices, and components. For this reason in addition to the need for practical fault management implementation, fault management system domain boundaries frequently do not align with target system network continuity boundaries.

BRIEF DESCRIPTION OF THE DRAWINGS

Aspects of the disclosure may be better understood by referencing the accompanying drawings.

DESCRIPTION

Figure 1:
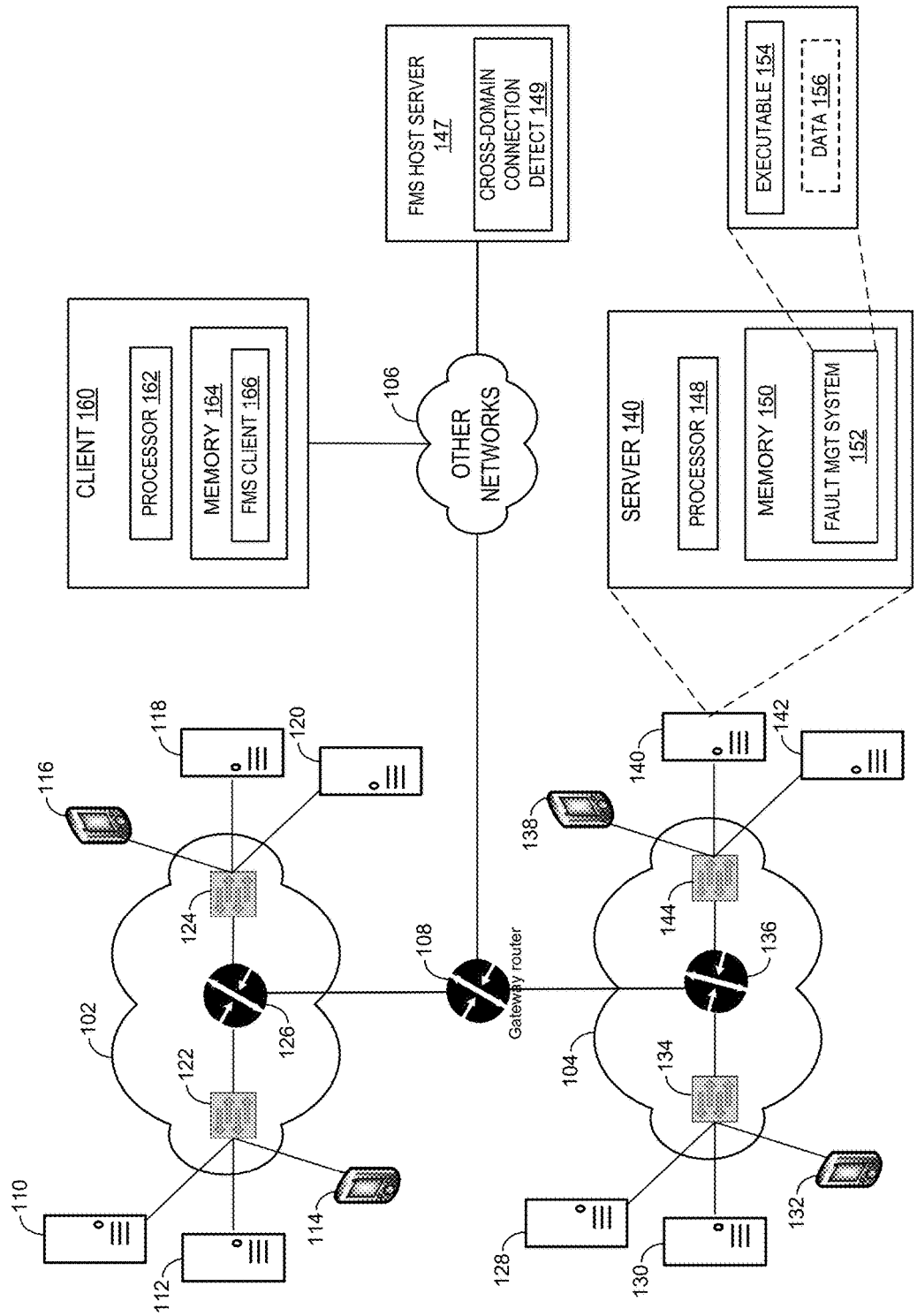
FIG. 1 is a block diagram depicting a network environment that implements a distributed management system in accordance with some embodiments.

The description that follows includes example systems, methods, techniques, and program flows that embody aspects of the disclosure. However, it is understood that this disclosure may be practiced without some of these specific details. In other instances, well-known instruction instances, protocols, structures and techniques have not been shown in detail in order not to obfuscate the description.

Overview

A management system may be characterized as comprising software components that perform some type of utility function, such as fault management, with respect to an underlying target system. A "target system" may be characterized as a system configured, using any combination of coded software, firmware, and/or hardware, to perform user processing and/or network functions. For example, a target system may include a local area network (LAN) comprising target system components such as network connectivity devices such as routers and switches as well as end-nodes such as host computer devices. A management system may be deployed to perform performance support utility tasks such as performance monitoring and fault detection and remediation functions performed by fault management systems. A management system typically employs operational/communication protocols distinct from those employed by the target system components. For example, many fault management systems may utilize some version of the Simple Network Management Protocol (SNMP). A distributed management system may be generally characterized as comprising multiple management system program instances that are hosted by a management system host.

In some embodiments, a distributed management system is configured, using any combination of coded software, firmware, and/or hardware, to determine target system connectivity between management system domains (also referred to herein as service domains). The service domains are each configured in accordance with a respective management system instance to include one or more target system components. The distributed management system may include a cross-domain discovery unit that is configured, using any combination of coded software, firmware, and/or hardware, to determine target system network connections that extend between service domains. For example, the management system may be a distributed fault management system comprising multiple domains of specified target system components. In some embodiments, the discovery unit may comprise a host component that is logically associated with a host target application.

The discovery unit may further include service agents deployed with the target system devices within each of the service domains. The host discovery component may coordinate network and subnetwork identification processes of the service agents to associate each of multiple service domains with one or more identified subnets. The subnet information and associations with specified service domains may be utilized to determine connections between target system devices that cross domain boundaries and would otherwise not be discovered by the management system instances.

Example Illustrations

FIG. 1 is a block diagram depicting a network environment that implements a distributed management system in accordance with some embodiments. The network environment includes multiple networked devices configured into a pair of subnets 102 and 104. As utilized herein, a subnet may be characterized as a programmatically/logically distinguishable subdivision of a larger network. Subnet 102 comprises network connectivity devices such as a router 126 and switches 122 and 124. Router 126 and switches 122 and 124 provide OSI layer 3 (routing) and layer 2 (switching)

connectivity among multiple end-point devices, or "end-nodes." As shown the end-nodes include host devices 110, 112, and 114 that are logically connected by switch 122 to router 126. The end-nodes further include host devices 116, 118, and 120 that are logically connected by switch 124 to router 126. Subnet 104 comprises network connectivity devices such as a router 136 and switches 134 and 144. Router 136 and switches 134 and 144 provide OSI layer 3 and layer 2 connectivity among multiple end-nodes including host devices 128, 130, and 132 that are logically connected by switch 134 to router 136, and host devices 138, 140, and 142 that are logically connected by switch 144 to router 136.

In the depicted embodiment, network connectivity devices and end-nodes are configured within the respective subnets 102 and 104 based, at least in part, on a network address format used by a network addressing protocol. For example, Internet Protocol (IP) network routing may be utilized by the network devices/components including network interfaces used by each of the connectivity and end-nodes. In this case, subnets 102 and 104 may be configured based on an IP network address format in which a specified fixed-bit prefix specifies the subnet ID and the remaining bits form the device-specific address.

The end-point and connectivity devices within subnets 102 and 104 are mutually interconnected via a gateway router 108. The end-nodes (e.g., host device 114) may be a portable wireless computing device such as a smartphone or a tablet computer. Others of the end-nodes may comprise any combination of computer terminals from which applications, network clients, network servers, and other type of application and system programs may be executed. While the logical and/or physical network connectivity between the subnets and among the subnet devices is expressly illustrated (as connecting lines), additional programmatic configurations may be present. For example, two or more of the end-nodes within subnets 102 and/or 104 may execute distributed instances of an application hosted and served by another of the nodes or by an application server coupled to subnets 102 and 104 via gateway router 108 and other networks 106.

The depicted network environment further includes a distributed management system that may comprise any number of devices and components including combinations of coded software, firmware, and/or hardware. The distributed management system is configured to perform a utility management function with respect to the operations of hardware and/or software systems, subsystems, devices, and components executing or otherwise implemented within or across one or more of the target system components. The depicted management system comprises multiple management system instances that are hosted by a host server. For example, end-node 140 is depicted as comprising a server having a processor 148 and associated memory 150. As shown, a fault management system (FMS) instance 152 is deployed within server 140 as other instances may be deployed within one or more additional of the end-nodes within subnets 102 and 104.

FMS instance 152 includes executable code 154 and data 156 utilized for performance monitoring and fault detection of a specified service domain. The executable code 154 may also include program instructions for configuring the specified service domain as including a number of the connectivity and end-nodes within subnets 102 and 104. In some embodiments, FMS instance 152 may utilize SNMP protocol for performing operations and functions related to monitoring performance and detecting faults. In such embodiments, the data 156 may include Management Information Bases (MIBs) maintained for each of the devices/components being monitored or otherwise managed.

The multiple FMS instances, including FMS instance 152, are deployed and hosted by an FMS host server 147 that may deployed from a same or a different computer platform than those executing the distributed FMS instances. FMS host server 147 is configured to coordinate deployment of individual ones of the FMS instances including maintaining records of the IDs of the FMS instances and the IDs of the devices/components monitored by the FMS instances. In addition, FMS host server 147 includes a connection discovery unit 149 that is configured using any combination of logic components and data to identify target system connections that extend/span between different FMS domains. As shown in FIG. 1, FMS host server 147 is communicatively coupled via one or more networks 106 to the devices within subnets 102 and 104 as well as to a client computer 160. Similar to any of the end-nodes within subnets 102 and 104, client computer includes a processor 162 and associated computer memory 162 from which an FMS client 166 executes. In some embodiments, FMS client 166 may request and retrieve fault management information obtained and stored by any of the FMS instances and/or FMS host server 147.

Figure 2:
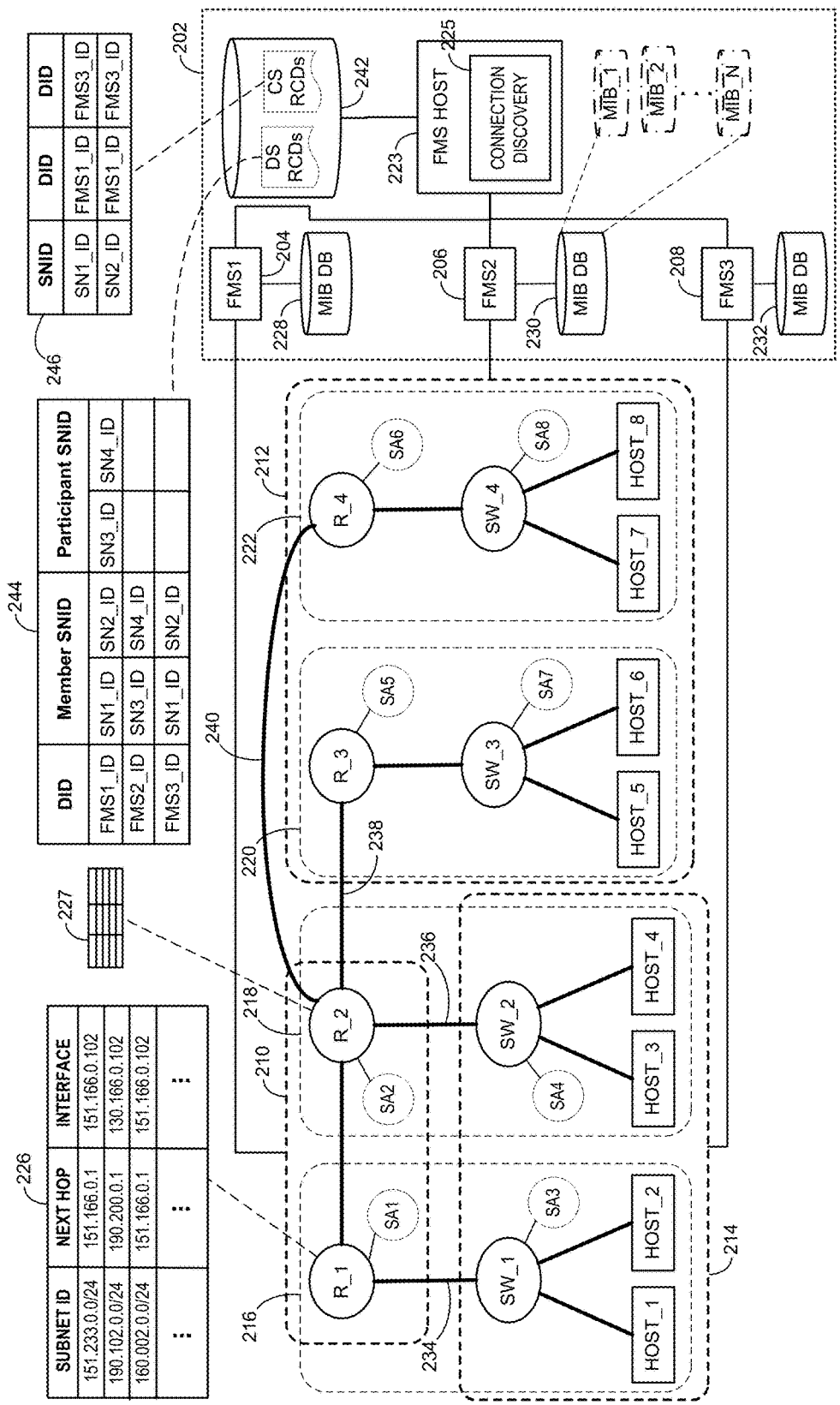
FIG. 2 is a block diagram illustrating a system for discovering target system connectivity among service domains in accordance with some embodiments.

As described in further detail with reference to FIG. 2, the connection discovery unit 149 includes program code for determine connectivity within and between subnets based on information collected and managed for individual FMS service domains. FIG. 2 is a block diagram illustrating a system for discovering target system connectivity between service domains in accordance with some embodiments. The depicted system may be implemented by one or more of the systems, subsystems, devices, and components illustrated in FIG. 1. The system includes a distributed management system 202 comprising FMS instances 204, 206, and 208. As depicted and explained with reference to FIG. 1, the multiple FMS instances of a distributed FMS may be deployed from one or more computer platforms and are deployed by and otherwise coordinated by a central FMS server, such as FMS host server 223.

FMS host server 223 is configured, using any combination of coded software, firmware, and/or hardware, to deploy and coordinate FMS instances 204, 206, and 208. For each of the FMS instances, FMS host server 223 determines service domains that each comprise and specify a set of target systems, subsystems, devices, and components to be monitored and otherwise managed by the corresponding FMS instance. In the depicted embodiment, the FMS instances 204, 206, and 208 are each configured to manage systems, subsystems, devices, and components (collectively referred to herein alternatively as "target system components" or "components" for ease of description) that are configured in a networked target system.

The depicted target system includes subnets 216, 218, 220, and 222. Subnet 216 includes a router R_1, a switch SW_1, and a pair of end-nodes HOST_1 and HOST_2. Subnet 218 includes a router R_2, a switch SW_2, and a pair of end-nodes HOST_3 and HOST_4. Subnet 220 includes a router R_3, a switch SW_3, and a pair of end-nodes HOST_5 and HOST_6. Subnet 222 includes a router R_4, a switch SW_4, and a pair of end-nodes HOST_7 and HOST_8. Each of subnets 216, 218, 220, and 222 are similarly configured as subnets by the use of common network address sub-field values. For example, the target system components may be configured within subnets 216, 218, 220, and 222 by assignment of a common IP address prefix for each component within a given subnet.

The end-nodes HOST_1 through HOST_8 may be data processing platforms comprising any combination of software and/or hardware for transmitting, receiving, and processing data within and across their respective subnets. The switches, SW_1 through SW_4 may comprise network switches for establishing OSI Level 2 and/or Level 3 connectivity among components in the respective subnets. The routers, R_1 through R_4 comprise data relay devices for establishing OSI Level 3 connectivity among components within and across the respective subnets.

FMS instances 204, 206, and 208 are configured to manage respective service domains that intersect various portions of subnets 216, 218, 220, and 222. For example, FMS instance 204 is configured to manage a service domain 210 comprising router R_1 within subnet 216 and router R_2 within subnet 218. FMS instance 206 is configured to manage a service domain 212 comprising router R_3, switch SW_3 and end-nodes HOST_5 and HOST_6 within subnet 220, and router R_4, switch SW_4, and end-nodes HOST_7 and HOST_8 within subnet 222. FMS instance 208 is configured to manage a service domain 214 comprising switch SW_1 and end-nodes HOST_1 and HOST_2 within subnet 216, and switch SW_2 and end-nodes HOST_3 and HOST_4 within subnet 218.

Each of FMS instances 204, 206, and 208 is configured to monitor target system components within their respectively assigned service domains to detect, isolate, identify, and remediate fault conditions that may occur during target system operation. To this end, FMS instance 204, 206, and 208 deploy service agents for each of the individual target system components to be monitored. For example, FMS instance 204 deploys service agent SA1 to monitor router R_1 and service agent SA2 to monitor router R_2. Each of the depicted service agents SA1 through SA8 generally represents a relatively small code item (e.g., command, query) configured to monitor a respective target system component by detecting and collecting performance data or other metrics such as link speed and throughput of network traffic processed by the target device. The service agents are also programmed to detect fault conditions associated with the performance metrics. While not expressly depicted in FIG. 2, additional service agents may be deployed to monitor the end-nodes.

Pursuant to domain-centric management, the service agents in conjunction with other FMS instance functionality generate records within respective management information bases (MIBs). The management records for service domains 210, 212, and 214 are collected within MIB databases 228, 230, and 232, respectively. For instance, MIB database 230 includes multiple MIB records MIB_1 through MIB_N that correspond to data collected by service agents for each of the managed components within service domain 212. The fault management function performed by each of FMS instances 204, 206, and 208 includes discovering network connections between target system components within their respective service domains. For example, each of the FMS instances may include an automatic discovery feature in which the service agents are configured to determine network connectivity among components with a respective service domain.

To discover target component connectivity, the service agents may use component IDs that include network address information to access router tables and other connectivity information stored by the target components. The component IDs utilized by the service agents for connection discovery are typically directly or indirectly obtained from configuration information of a particular service domain. In this manner, FMS instance 204 may discover the depicted network connection between R_1 and R_2, and FMS instance 206 may discover the network connection between router R_3 and switch SW_3 and between switch SW_3 and end-nodes HOST_5 and HOST_5. FMS instance 206 also discovers the connection between router R_4 and switch SW_4 and between switch SW_4 and end-nodes HOST_7 and HOST_8. In the same manner, FMS instance 208 discovers the connections between switch SW land end-nodes HOST_1 and HOST_2, and between switch SW_2 and end-nodes HOST_3 and HOST_4.

The embodiments disclosed herein provides techniques and mechanisms that leverage existing programming infrastructure and domain-centric data collection to enable a distributed management system to efficiently discover target network connectivity that extends across and between service domains. FIG. 2 illustrates a cross-domain target component connection 234 between router R_1 and switch SW_1 that are each members of a common subnet 216 (similarly for connection 236 between co-subnet components R_2 and SW_2). Cross-domain target component connections may also occurs between different subnets as illustrated by connection 238 (between R_2 in subnet 218 and R_3 in subnet 220) and connection 240 (between R_2 in subnet 218 and R_4 in subnet 222). To enable cross-domain network connection discovery, FMS host 223 further includes a cross-domain connection discovery unit 225 that is communicatively coupled with each of FMS instances 204, 206, and 208.

Connection discovery unit 225 is configured to detect and identify target device connectivity across service domain boundaries. Such cross-domain target system connections are exemplified in FIG. 2 as connections 234, 236, 238 and 240. As described in further detail with reference to FIG. 3, cross-domain detect unit 225 is configured to leverage subnet information as a vehicle for efficiently identifying cross-domain connections that would otherwise require individually traversing the individual connectivity information of large numbers of individual target system components. In some embodiments, connection discovery unit 225 may first identify, for each of the individual service domains, each of the subnets having at least one target system component within the service domain. Connection discovery unit 225 may access MIB databases 228, 230, and 232 to identify the subnets to which the target system components within each domain belong. Connection discovery unit 225 may access MIB database 230 and parse or otherwise read IP address information for the target system components configured within service domain 212.

In some embodiments, IP address prefixes may be utilized to identify the subnets to which the target system components belong. Subnet masks may be applied to networked components to determine the prefixes. In the depicted embodiment, cross-domain detect unit 225 determines, based on IP prefix information, that each of service domains 210 and 214 includes components within subnets 216 and 218. Connection discovery unit 225 also uses IP address prefix information to determine that service domain 212 includes target system components within subnets 220 and 222. Connection discovery unit 225 records the subnet/service domain intersection data within a cross-domain connection database 242. More specifically, connection discovery unit 225 generates and stores domain subnet records 244 that associate each of the service domain IDs with the IDs of the subnets for which one or more components reside in the domain. Domain subnet records 244 include three row-wise entries each that associate a domain ID (DID) with one or more subnet IDs (SNIDs).

In FIG. 2, the domain IDs FMS1_ID, FMS2_ID, and FMS3_ID within domain subnet records 244 are the ID strings for service domains 210, 212, and 214, respectively. The subnet IDs SN1_ID, SN2_ID, SN3_ID, and SN4_ID within domain subnet records 244 are the ID strings for subnets 216, 218, 220, and 222, respectively. Having identified or otherwise determined the subnets that intersect with each of the service domains, connectivity discovery unit 225 records SN1_ID and SN2_ID in association with FMS1_ID, records SN3_ID and SN4_ID in association with FMS2_ID, and records SN1_ID and SN2_ID in association with FMS3_ID.

Cross-domain detect unit 225 utilizes the information within domain subnet records 244 to determine, from among the identified subnets, which subnets include target system components in more than one service domain and stores the results in common subnets table 246. As shown, common subnets table 246 may comprise a table indexed by subnet ID as the key. Connection discovery unit 225 populates the common subnets records entries based on domain/subnet intersection stored in domain subnet records 244. For example, connection discovery unit 225 may compare the first and third of the row-wise domain subnet records 244 to determine that subnet 216 (corresponding to subnet ID SN1_ID) includes at least one target component within FMS 210 (corresponding to service domain ID FMS1_ID) and at least one component within FMS 214 (corresponding to service domain ID FMS3_ID). As a result, connection discovery unit 225 enters the first row-wise record with common subnets records that associates SN1_ID with FMS1_ID and FMS3_ID. Using this method, connection discovery unit 225 also records SN2_ID in association with service domain IDs FMS1_ID and FMS3_ID.

In the forgoing manner, connection discovery unit 225 determines and records that subnets SN1 and SN2 extend across at least two service domains (FMSs 210 and 214 in the depicted embodiment). Connection discovery unit 225, individually or in any combination with one or more of the FMS instances utilizes the domain subnet and common subnet information within cross domain database 242 to identify target system connections between two or more of service domains 210, 212, and 214. Depicted examples of such cross-domain connections include connection 234 between router R_1 within service domain 210 and switch SW_1 within service domain 214. Cross-domain connection 236 is similarly between a component (R_2) within service domain 210 and a component (SW_3) within service domain 214. Each of cross-domain connections 234 and 236 are between components within the same subnet (connection 234 between components within subnet 216 and connection 236 between components within subnet 218). In addition or alternatively, the cross-domain connections may be between components within different, but mutually participating subnets. For instance, connection 238 comprises a physical and logical (i.e., via route address mapping) connection between router R_2 within subnet 218 and router R_3 within subnet 220. Similarly, connection 240 provides physical and logical connectivity between router R_2 within subnet 218 and router R_4 within subnet 222.

Information recorded within cross-domain connection database 242 as well as input from the FMS instances and one or more of the service agents may be utilized to detect one or more of the depicted cross-domain connections. Connection discovery unit 225 may be configured to determine cross-domain connections 234 and 236 by using information within MIB databases 228 and 232 and common subnet records 246. Specifically, connection discovery unit 225 determines from the first record in common subnet records 246 that subnet 216 extends across service domains 210 and 214. Connection discovery unit 225 responds by accessing MIB databases 228 and 232 to identify network connectivity components within service domains 210 and 214 and that are also within subnet 216.

For instance, the MIB databases may include network address information that directly or indirectly indicates the subnet to which each of the domain components belongs. MIB databases may further include component ID information that indicates whether a given component is a connectivity device (e.g., a switch or router). In this manner, connection discovery unit 225 identifies router R_1, switch SW_1, and end-nodes HOST_1 and HOST_2 as being included within subnet 216. Discovery unit 225 further identifies R_1 and SW_1 as being the connectivity devices within subnet 216. In response, discovery unit 225, either alone or in cooperation with FMS instances 204 and 208 issues connection discovery requests to services agents SA1 and SA3 to determine connectivity information for R_1 and SW_1, respectively. In the depicted embodiment, service agent SA1 may read a routing table 226 for R_1 to determine connections including the cross-domain connection 234 to SW_1. Connection discovery unit 225 may identify connection 234 as a cross-domain connection based on the connection end-points R_1 and SW_1 being associated with different service domains.

Discovery unit 225 may initially determine from the second record in common subnet records 246 that subnet 218 extends across service domains 210 and 214. Using this information as a starting point, discovery unit 225 further determines that subnet 218 also extends to service domain 212 in the following manner. Having determined that subnet 218 extends across service domains 210 and 214, connection discovery unit 225 accesses MIB databases 228 and 232 to identify network connectivity components within service domains 210 and 214 and that are also within subnet 218.

Discovery unit 225 identifies router R_2, switch SW_2, and end-nodes HOST_3 and HOST_4 as being included within subnet 218. Discovery unit 225 further identifies R_2 and SW_2 as being the connectivity devices within subnet 218. In response, discovery unit 225, either alone or in cooperation with FMS instances 204 and 208 issues connection discovery requests to services agents SA2 and SA4 to determine connectivity information for R_2 and SW_2, respectively. Service agent SA2 may read a routing table 227 for R_2 to determine connections including the cross-domain connection 236 to SW_2. Connection discovery unit 225 may identify connection 236 as a cross-domain connection based on the connection end-points R_2 and SW_2 being associated with different service domains.

The cross-domain detection logic within connection discovery unit 225 and/or within FMS instance 204 may further determine from router table 227 that R_2 is directly connected to each of routers R_3 and R_4 via cross-domain connections 238 and 240. The cross-domain connection detect logic is configured to determine and compare the subnet addresses of R_3 and R_4 with matching subnet address information in the second row-wise entry of domain subnet records 244. Based on determining matching subnet addresses that are associated with service domain 212 within the second entry of records 244, discovery unit 225 identifies R_3 and R_4 as non-member participants in subnet 218. Connection discovery unit 225 may be further configured to report the foregoing cross-domain connectivity information to one or more of FMS instances 204, 206, and 208 such that the information may be recorded within MIB databases 228, 230, and 232.

Figure 3:
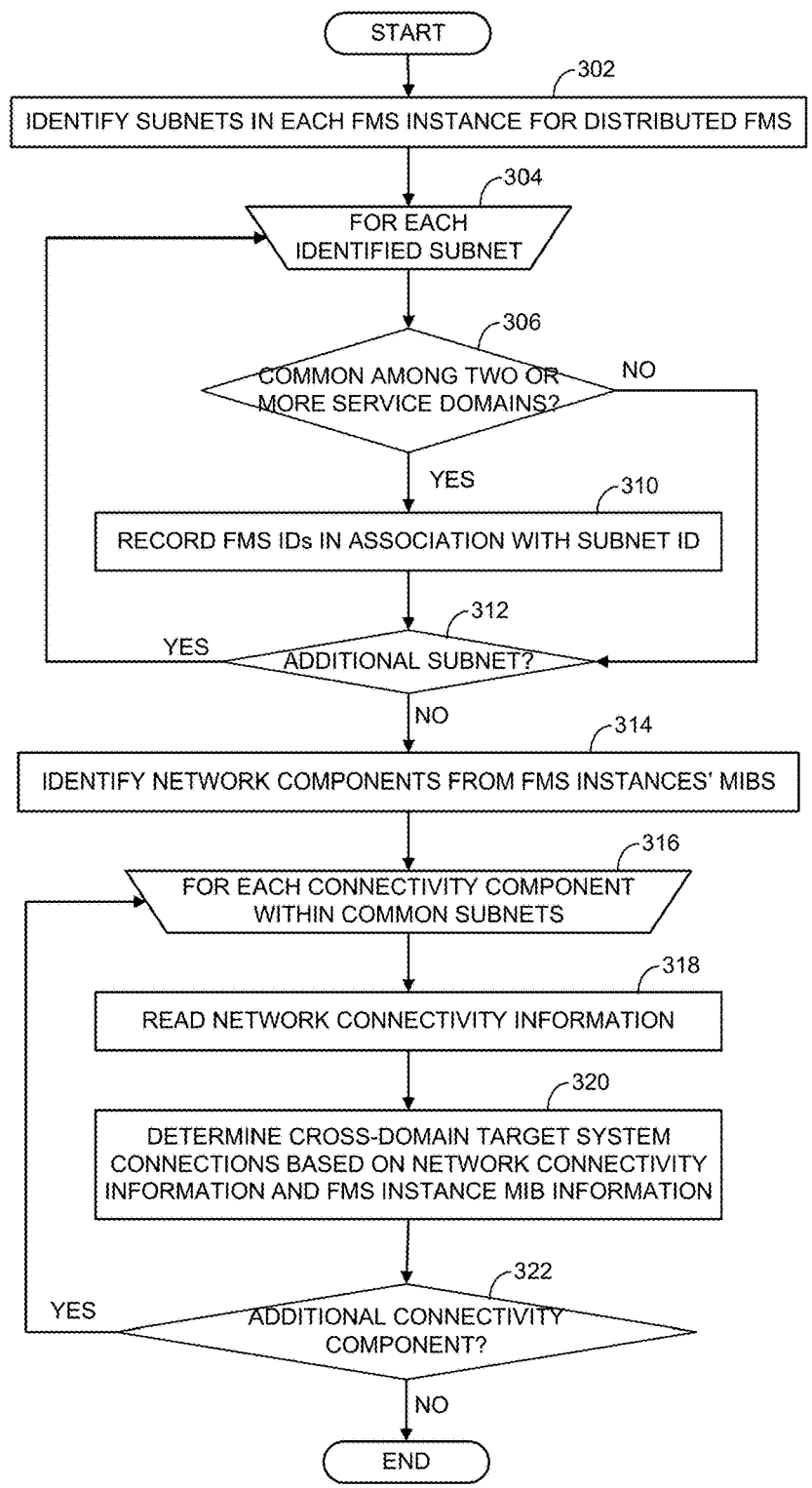
FIG. 3 is a flow diagram depicting operations and functions for discovering target system connectivity between and across service domains in accordance with some embodiments.

FIG. 3 is a flow diagram depicting operations and functions for discovering target system connectivity between and across service domains in accordance with some embodiments. The operations and functions depicted in FIG. 3 may be performed by one or more of the systems, subsystems, and components shown in FIGS. 1 and 2. Such components may include a connectivity discovery unit comprising portions of logic configured within the FMS instances and/or FMS host depicted in FIG. 2. The process begins as shown at block 302 with a connectivity discovery unit identifying or otherwise determining one or more subnets in each of one or more FMS domains. In one embodiment, the discovery unit may send a request to one or more FMS instances (i.e., application program instances) to access MIB records that include network address information for components within each of the respective service domains. The set of MIB records for each individual service domain may include data objects such as tables and records that identify and otherwise describe the component and devices within the respective service domain. In some embodiments, the subnets within a given service domain may be identified based on network address prefixes of the components specified by the MIB records of the service domain.

As shown at block 304, a next of the identified subnets is processed by the discovery unit to determine whether the subnet extends between two of more of the service domains. The discovery unit may determine whether or not a given subnet extends between service domains by comparing the domain subnet information obtain at block 302. More specifically, the discovery unit may compare occurrences of subnet IDs within respective domain subnet records (e.g., domain subnet records 244) to determine whether the subnet includes at least one component in each of at least two service domains. In response to the discovery unit determining that the subnet does not extend between at least two of the service domains, control passes from block 306 to block 312 with a determination of whether unprocessed subnets remain. If so, control returns to block 304 for a cross-domain determination for a next of the identified subnets.

In response to determining at block 306 that the subnet extends to (i.e., is common among) two or more of the service domains, with the connectivity discovery unit identifying or otherwise determining which of the subnets identified at block 202 are shared among/across the FMS domains. Following control passing from block 312 to block 314, all subnets identified at block 302 have been evaluated to determine which are common among two or more service domains. As shown at block 314, the discovery unit accesses the MIB databases of each of the management system instances to identify network connectivity components such as routers and switches within the subnets identified as extended between at least two service domains.

The process continues beginning at block 316 with a determination of network connectivity information for a next one of the identified connectivity components (block 318). For instance, the discovery unit may read entries in a routing table for each of multiple routers in a "shared" subnet to identify connections from the individual routers to other connectivity devices or end-nodes. Having identified the network connections for a given component, the discovery unit determine which of the identified connections extends from one service domain to at least one other service domain (block 320). The foregoing process is repeated for each identified connectivity component with control passing from block 322 back to block 316 until all connectivity devices within shared subnets have been processed and the process ends.

Figure 4:
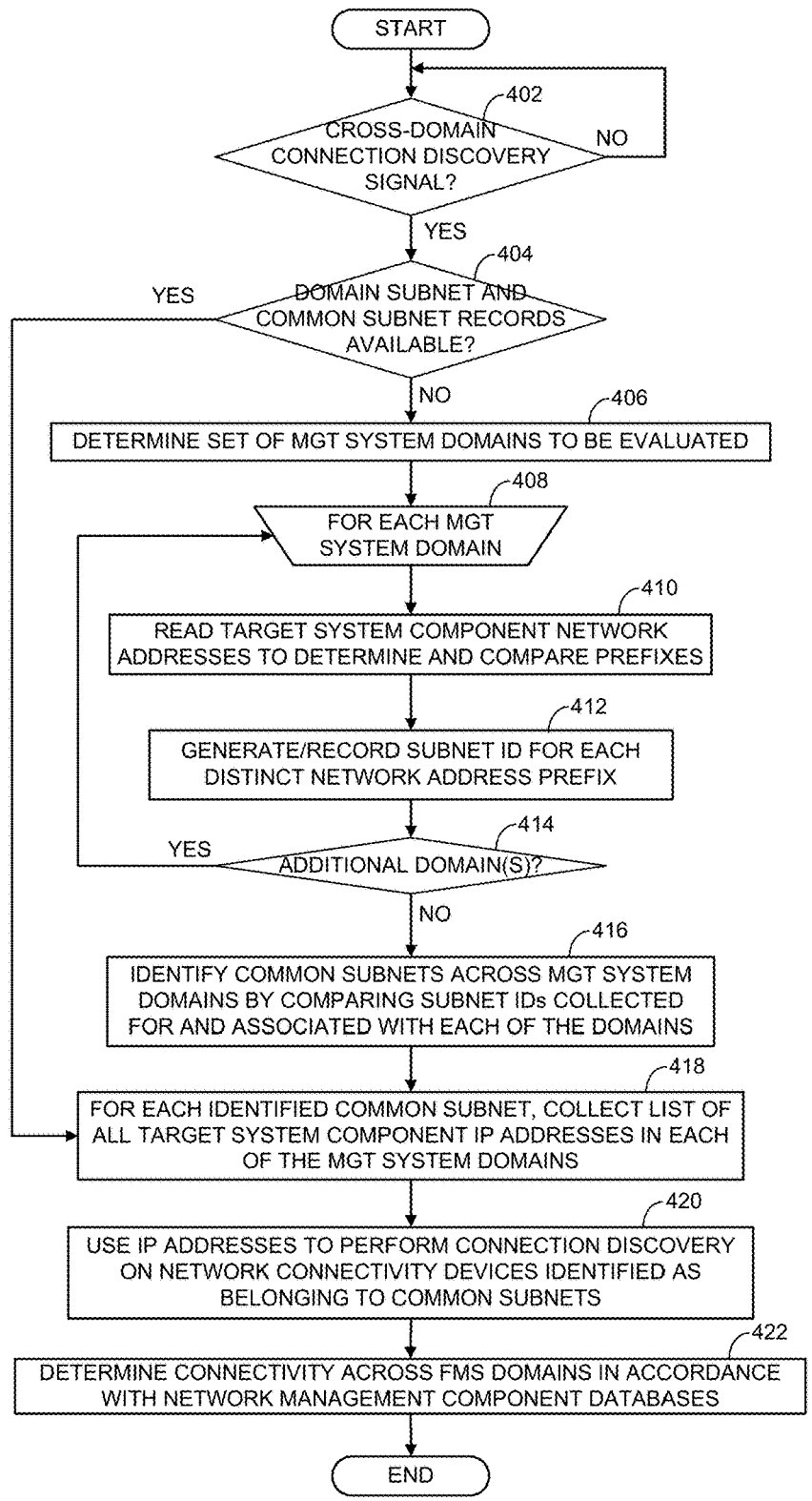
FIG. 4 is a flow diagram illustrating operations and function for detecting cross-domain target system component connections in accordance with some embodiments.

FIG. 4 is a flow diagram illustrating operations and function for detecting cross-domain target system component connections in accordance with some embodiments. The operations and functions depicted in FIG. 4 may be performed by one or more of the systems, subsystems, and components shown in FIGS. 1 and 2 and described with reference to FIG. 3. Such components may include a connectivity discovery unit comprising portions of logic configured within the FMS instances and/or FMS host depicted in FIG. 2. The process begins as shown at block 402 with the discovery unit detecting a cross-domain connection discovery request message in response to which point control passes to block 404. If, as shown at blocks 404 and 406, domain subnet and common subnet records have not been generated or the information from such records is not otherwise available, the discovery unit commences a connection discovery cycle. The cycle may begin as shown at block 406 with the discovery unit determining the set of service domains (e.g., management system domains) to be included in cross-domain connection discovery. For instance, the discovery unit may determine that all fault management system instances hosted by a fault management server will be included in the connection discovery.

The cycle continues with the discovery unit processing a next one of the service domains which is defined, at least in part, by a corresponding MIB database of a corresponding management system instance (block 408). First, the discovery unit the network address information of each of the target system components specified as included in the service domain to determine the network prefixes of the components (block 410). In some embodiments, the network prefixes are IP subnet addresses for the respective components and may be read from IP network prefix information within the MIB database. The discovery unit records the subnet ID (e.g., the subnet address) of each different subnet identified for the service domain such as in the domain subnet records shown in FIG. 2 (block 412). The per-domain subnet discovery and recordation process continues with control passing from block 414 back to block 408 until the subnets that include components within each of the domains have been identified and recorded.

The process continues with the discovery unit identifying which of the identified domain subnets are shared across two or more service domains (block 416). For instance, the discovery unit may compare the subnet IDs records for each of the service domains to identify which of the subnets include at least one component in two or more of the service domains. When control passes from block 412 to block 418, all subnets identified and recorded at blocks 410 and 412 have been evaluated to determine which are common among two or more service domains. For example, the discovery unit may determine that for a total of 28 subnets identified as belong to at least one of the service domains, 12 are shared among all of the service domains, 6 are shared by two of the service domains, and the remaining 10 are shared by three of the service domains. Having identified the "shared" subnets, the discovery unit collects and records the IP addresses for all IP-addressable devices and components within each of the service domains (block 418). In association with collecting the IP addresses, the discovery unit may further determine, based on information in the respective MIB databases, which of the target system components are network connectivity devices (e.g., routers and switches).

The process continues with the discovery unit accessing routing and switching information for network connectivity devices within the identified common subnets to detect target component connections between two or more of the service domains (block 420). For example, the discovery unit may send a request to a service agent within a first service domain requesting connection information for a router device. The request may include the component ID of the router that enables the service agent to access a routing table maintained by the router. The service agent may then identify connections to multiple devices based on next hop and other information in the routing table. The service agent returns the connection information, including subnet addresses/IDs, associated with each of the connections to the discovery unit. The discovery unit receives the connection information and compares the connection information with component information, including intra-domain connectivity information, to determine network connections between target system components included within different service domains. At block 422, the discovery unit processing the IP address information together with the shared subnet data to determine connections between intermediate connectivity devices (e.g., switches and/or routers) belonging to different subnets. Based on the determined cross-subnet connections, the connectivity discovery unit identifies components and devices that are connected, via the cross-subnet connections, across different FMS domains and, in some embodiments, the process ends. In other embodiment, the discovery unit reports one or more of the cross-domain component connections to one or more devices in the distributed management system.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality provided as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
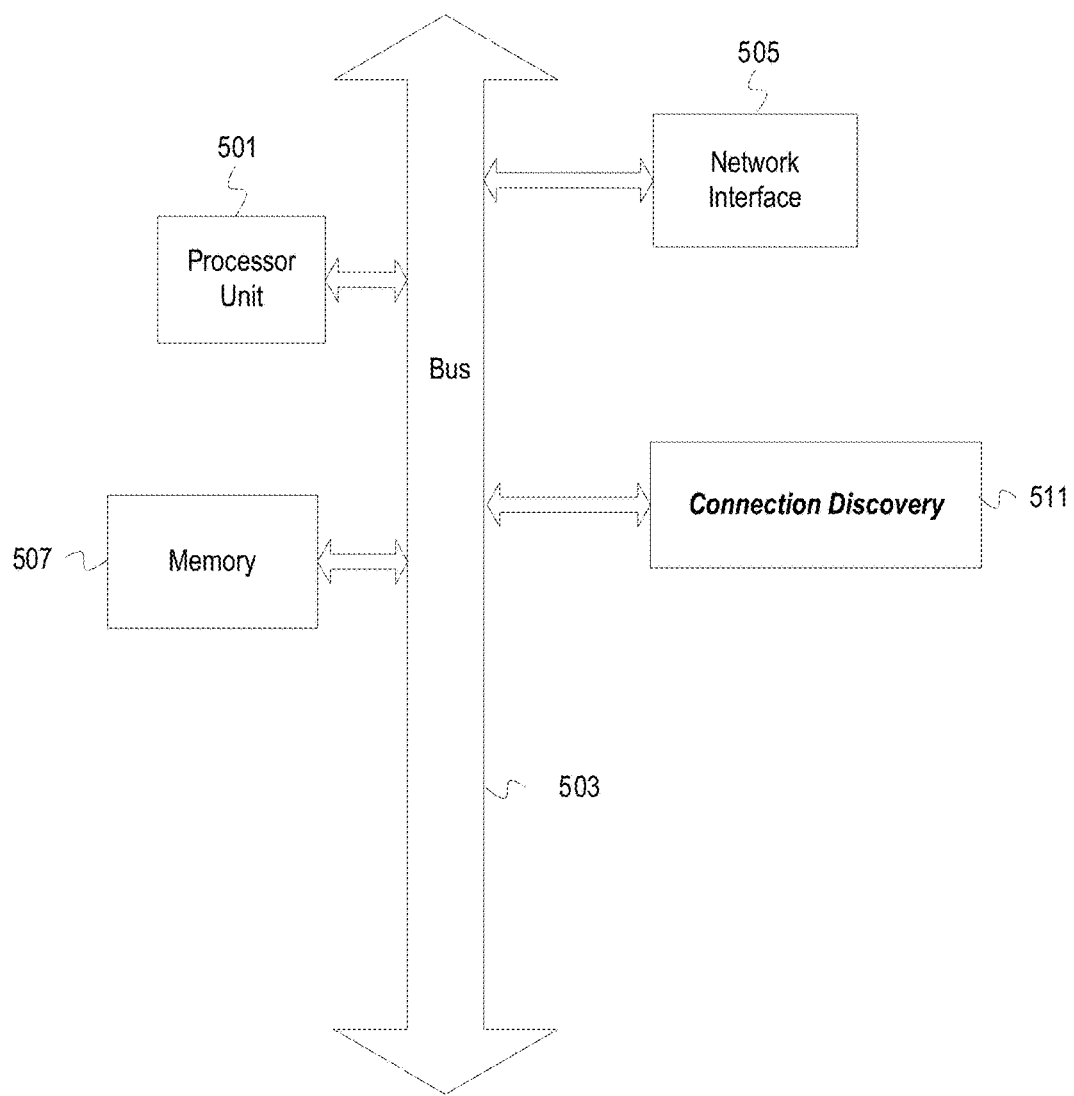
FIG. 5 is a block diagram depicting an example computer system that implements connection discovery in a distributed management system environment in accordance with some embodiments.

FIG. 5 depicts an example computer system that implements connection discovery in a multiple-FMS environment in accordance with an embodiment. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The system also includes a connection discovery subsystem 511. Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501.

While the aspects of the disclosure are described with reference to various implementations and exploitations, it will be understood that these aspects are illustrative and that the scope of the claims is not limited to them. In general, techniques for an object storage backed file system that efficiently manipulates namespace as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method for determining target system connectivity between service domains, said method comprising:
    for each of multiple service domains configured within a distributed management system, identifying subnets having at least one target system component within the service domain, wherein each of the subnets comprises target system components having a same network address prefix;
    determining, from among the identified subnets, subnets that each extend across two or more of the service domains, wherein determining subnets that each extend across two or more of the service domains comprises,
        for each of the service domains, generating a domain subnet record that associates one service domain ID with subnet IDs of subnets identified as having at least one target system component within the one service domain; and
        comparing instances of subnet IDs among the generated domain subnet records to determine multiple instances of one or more subnet IDs across the generated domain subnet records;
    for each of the subnets that extend across two or more of the service domains, detecting target system network connections between two or more of the service domains; and
    reporting the detected target system network connections to one or more entities within the distributed management system.

2. The method of claim 1, wherein said detecting target system network connections between two or more of the service domains comprises determining network routing connectivity between the service domains in accordance with component ID information in a network management component databases that each correspond to a respective one of the service domains.

3. The method of claim 1, wherein said detecting target system network connections between two or more of the service domains comprises:
    for each of the target system components within a service domain determined to include a subnet that extends to at least one other service domain,
        determining whether the target system component is a network routing device; and
        if the target system component is a network routing device, performing a connection discovery on the target system component.

4. The method of claim 1, wherein said detecting target system network connections between two or more of the service domains comprises performing connection discovery on network connectivity devices identified as belonging to the subnets determined to extend across two or more service domains.

5. The method of claim 1, wherein each of the service domains is configured in accordance with a target system component configuration of a corresponding one of multiple distributed management system instances, said detecting target system network connections between two or more of the service domains further comprising:
    retrieving, from the management system instances, network addresses of target system components from each of the service domains that include portions of subnets determined to extend between two or more of the service domains; and
    accessing routing information of network connectivity devices based, at least in part, on one or more of the retrieved network addresses; and
    determining target system component connectivity across one or more of the service domains based on the routing information and the service domain IDs associated with each of the distributed management system instances.

6. The method of claim 1, wherein said identifying subnets having at least one target system component within the service domain comprises, for each of the service domains,
    reading network addresses of the target system components within the service domain;
    determining subnet IDs based on network address prefixes within the network addresses; and
    distinguishing between different subnets based on different of the determined subnet IDs.

7. One or more non-transitory, machine-readable storage media having program code for determining target system connectivity between service domains stored therein, the program code to:
    for each of multiple service domains configured within a distributed management system, identify subnets having at least one target system component within the service domain, wherein each of the subnets comprises target system components having a same network address prefix;

determine, from among the identified subnets, subnets that each extend across two or more of the service domains, wherein the program code to determine subnets that each extend across two or more of the service domains comprises program code to, for each of the service domains, generate a domain subnet record that associates one service domain ID with subnet IDs of subnets identified as having at least one target system component within the one service domain; and compare instances of subnet IDs among the generated domain subnet records to determine multiple instances of one or more subnet IDs across the generated domain subnet records, for each of the subnets that extend across two or more of the service domains, detect target system network connections between two or more of the service domains; and report the detected target system network connections to one or more entities within the distributed management system.

8. The non-transitory, machine-readable storage media of claim 7, wherein the program code to detect target system network connections between two or more of the service domains comprises program code to determine network routing connectivity between the service domains in accordance with component ID information in a network management component databases that each correspond to a respective one of the service domains.

9. The non-transitory, machine-readable storage media of claim 7, wherein the program code to detect target system network connections between two or more of the service domains comprises program code to:

for each of the target system components within a service domain determined to include a subnet that extends to at least one other service domain, determine whether the target system component is a network routing device; and if the target system component is a network routing device, perform a connection discovery on the target system component.

10. The non-transitory, machine-readable storage media of claim 7, wherein the program code to detect target system network connections between two or more of the service domains comprises program code to perform connection discovery on network connectivity devices identified as belonging to the subnets determined to extend across two or more service domains.

11. The non-transitory, machine-readable storage media of claim 7, wherein each of the service domains is configured in accordance with a target system component configuration of a corresponding one of multiple distributed management system instances, the program code to detect target system network connections between two or more of the service domains further comprising program code to:

retrieve, from the management system instances, network addresses of target system components from each of the service domains that include portions of subnets determined to extend between two or more of the service domains; and access routing information of network connectivity devices based, at least in part, on one or more of the retrieved network addresses; and determine target system component connectivity across one or more of the service domains based on the routing information and the service domain IDs associated with each of the distributed management system instances.

12. The non-transitory, machine-readable storage media of claim 7, wherein the program code to identify subnets having at least one target system component within the service domain comprises program code to, for each of the service domains, read network addresses of the target system components within the service domain;

determine subnet IDs based on network address prefixes within the network addresses; and distinguish between different subnets based on different of the determined subnet IDs.

13. An apparatus comprising:

a processor; and a machine-readable medium having program code executable by the processor to cause the apparatus to, for each of multiple service domains configured within a distributed management system, identify subnets having at least one target system component within the service domain, wherein each of the subnets comprises target system components having a same network address prefix;

determine, from among the identified subnets, subnets that each extend across two or more of the service domains, wherein the program code to cause the apparatus to determine subnets that each extend across two or more of the service domains comprises program code to cause the apparatus to, for each of the service domains, generate a domain subnet record that associates one service domain ID with subnet IDs of subnets identified as having at least one target system component within the one service domain; and compare instances of subnet IDs among the generated domain subnet records to determine multiple instances of one or more subnet IDs across the generated domain subnet records, for each of the subnets that extend across two or more of the service domains, detect target system network connections between two or more of the service domains; and report the detected target system network connections to one or more entities within the distributed management system.

14. The apparatus of claim 13, wherein the program code executable by the processor to cause the apparatus to detect target system network connections between two or more of the service domains comprises program code executable by the processor to cause the apparatus to determine network routing connectivity between the service domains in accordance with component ID information in a network management component databases that each correspond to a respective one of the service domains.

15. The apparatus of claim 13, wherein the program code executable by the processor to cause the apparatus to detect target system network connections between two or more of the service domains comprises program code executable by the processor to cause the apparatus to:

for each of the target system components within a service domain determined to include a subnet that extends to at least one other service domain, determine whether the target system component is a network routing device; and if the target system component is a network routing device, perform a connection discovery on the target system component.

16. The apparatus of claim 13, wherein the program code executable by the processor to cause the apparatus to detect target system network connections between two or more of the service domains comprises program code executable by the processor to cause the apparatus to perform connection discovery on network connectivity devices identified as belonging to the subnets determined to extend across two or more service domains.

17. The apparatus of claim 13, wherein each of the service domains is configured in accordance with a target system component configuration of a corresponding one of multiple distributed management system instances, the program code executable by the processor to cause the apparatus to detect target system network connections between two or more of the service domains further comprising program code executable by the processor to cause the apparatus to:
  retrieve, from the management system instances, network addresses of target system components from each of the service domains that include portions of subnets determined to extend between two or more of the service domains; and
  access routing information of network connectivity devices based, at least in part, on one or more of the retrieved network addresses; and
  determine target system component connectivity across one or more of the service domains based on the routing information and the service domain IDs associated with each of the distributed management system instances.

* * * * *

UNITED STATES PATENT AND TRADEMARK OFFICE
CERTIFICATE OF CORRECTION

PATENT NO. : 10,225,131 B2
APPLICATION NO. : 15/235443
DATED : March 5, 2019
INVENTOR(S) : Balram Reddy Kakani et al.

Page 1 of 1

It is certified that error appears in the above-identified patent and that said Letters Patent is hereby corrected as shown below:

In the Claims

Column 14, Line 8, cancel the text beginning with "2. The method of claim 1" to and ending "service domains" in Column 14, Line 14, and insert the following claim:
--2. The method of claim 1, wherein said detecting target system network connections between two or more of the service domains comprises determining network routing connectivity between the service domains in accordance with component ID information in network management component databases that each correspond to a respective one of the service domains.--

Column 15, Line 26, cancel the text beginning with "8. The non-transitory, machine-readable" to and ending "service domains" in Column 15, Line 33, and insert the following claim:
--8. The non-transitory, machine-readable storage media of claim 7, wherein the program code to detect target system network connections between two or more of the service domains comprises program code to determine network routing connectivity between the service domains in accordance with component ID information in network management component databases that each correspond to a respective one of the service domains.--

Column 16, Line 49, cancel the text beginning with "14. The apparatus of claim 13" to and ending "service domains" in Column 16, Line 57, and insert the following claim:
--14. The apparatus of claim 13, wherein the program code executable by the processor to cause the apparatus to detect target system network connections between two or more of the service domains comprises program code executable by the processor to cause the apparatus to determine network routing connectivity between the service domains in accordance with component ID information in network management component databases that each correspond to a respective one of the service domains.--

Signed and Sealed this
Twenty-third Day of April, 2019

Andrei Iancu
*Director of the United States Patent and Trademark Office*